Sept. 9, 1969  J. JARRET ET AL  3,466,479
LOW-INERTIA VARIABLE-RELUCTANCE ELECTRICAL MACHINE
Filed Sept. 18, 1967  2 Sheets-Sheet 1
FIG.1
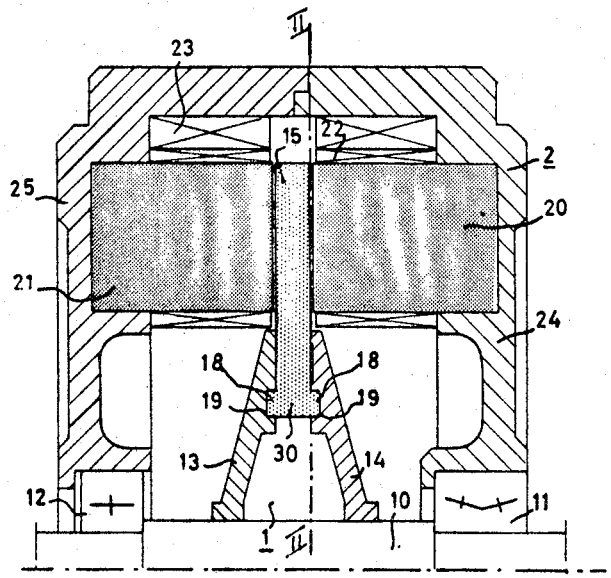
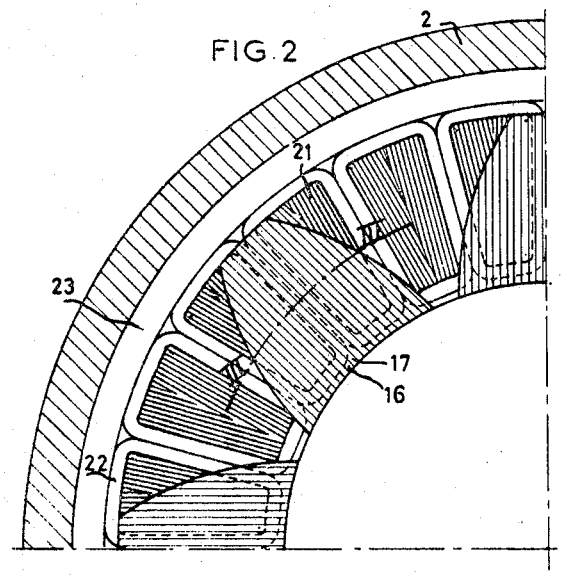
FIG.2
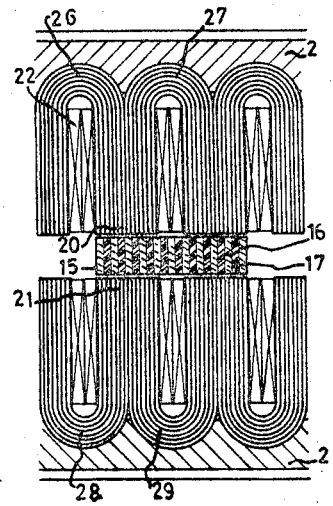
FIG.3
INVENTORS:
JEAN JARRET and
JACQUES JARRET
By Abraham A. Saffitz
ATTORNEY

United States Patent Office 3,466,479
Patented Sept. 9, 1969

3,466,479
LOW-INERTIA VARIABLE-RELUCTANCE ELECTRICAL MACHINE
Jean Jarret, La Champanelle, Chemin du Clos Baron, Fourqueux, France, and Jacques Jarret, 35 bis Ave. du Belloy, Le Vesinet, France
Filed Sept. 18, 1967, Ser. No. 668,405
Claims priority, application France, Sept. 19, 1966, 76,806
Int. Cl. H02k 19/20, 19/24
U.S. Cl. 310—168                     4 Claims

ABSTRACT OF THE DISCLOSURE

Variable reluctance electrical machine comprising a stator including magnetic poles arranged in two parallel rings separated by a gap parallel to the axis of the machine shaft, the magnetic poles of the two rings being respectively opposite one another, means for producing in said gap a direct-current magnetic field parallel to said axis and alternating current magnetic fields also parallel to said axis between opposite poles, and a rotor including two non-magnetic support members connected to the shaft and teeth formed by a stack of radially alternating magnetic and non-magnetic laminae, said stack being secured to said support members and being preferably formed by winding together a strip of magnetic material and a strip of non-magnetic material into a circular ring and subsequently deforming said circular ring to give it an angularly periodically varying radius, said teeth consisting of those parts of said deformed ring which have maximum radius.

---

This invention relates to a variable-reluctance electrical machine having a rotor which has a very low inertia about its axis.

One way of devising high-performance variable-reluctance machines is for the rotor teeth thereof to have a composite, magnetic and non-magnetic structure, whose mean magnetization intensity in a strong field is less than the saturation induction of the other magnetic parts of the machine. It results that only the teeth—and no other part of the machine—are saturated, which helps to localise strong fields to the places where they are most effective and makes it possible to control flux variations so that the sum of the fluxes modulated in the machine stays constant. In such machines, which form the subject of the applicants' U.S. patents, No. 3,062,979 issued Nov. 6, 1962, No. 3,171,049 issued Feb. 23, 1965, and No. 3,383,533 issued May 14, 1968, and of the applicants' U.S. patent application Ser. No. 550,540 filed May 16, 1966, the teeth form part of the machine rotor and the same forms a fairly large proportion of the magnetic circuit. This moving part of the magnetic circuit has a mass which is usually several tens of times greater than the mass of the teeth and therefore has considerable inertia which may make it difficult for rapid variations of angular velocity to occur.

The object of the invention is to provide variable-reluctance saturated-teeth machines similar to the general outline just given but with a rotor which has a much lower inertia about its axis than the rotors of the known machines.

According to the invention, the machine rotor shaft is rigidly connected mechanically just to the rotor teeth, the same taking the form of parallel magnetic laminations parallel to the shaft and being separated from one another by non-magnetic gaps so as to be saturated to the exclusion of every other part of the magnetic circuit; and the latter circuit, which comprises all the operative ferromagnetic materials, is stationary except for the rotor teeth and, with the windings and frame, forms the machine stator.

In one form of the invention, an electrical machine comprises a rotor comprising: a shaft; a number of teeth made up of laminations parallel to the axis of the shaft, preferably of alternate ferromagnetic and non-ferromagnetic material having a mean magnetization intensity (induction less field) in a strong magnetic field which is constant; and two non-magnetic support members which retain the teeth in a radial position and rigidly secure the teeth to the shaft, and a stator comprising two parallel symmetrical rings which are disposed opposite one another, each having poles made of a laminated ferromagnetic material and bearing appropriate windings; and a frame which closes the magnetic circuit outside the machine and in which the rotor shaft is mounted through the agency of plain or anti-friction bearings.

The radial teeth move in the air gaps bounded by the pole ends of the two oppositely disposed rings and transmit to the rotor the torque due to the magnetic fields which exist in the airgaps, the teeth offering little inertia in respect of variations of angular velocity. Means are provided for producing in said gaps a direct-current magnetic field parallel to the machine shaft axis, together with windings cooperating with said poles for producing in said gaps alternating magnetic fields also parallel to said axis.

The teeth are formed by alternately arranged laminations of feromagnetic material and laminations of insulating non-magnetic material, and each such lamination has at its base a widening which engages in the rotor support members and, by serving as shoulders, provides an anchorage which effectively opposes forces due to centrifugal force.

The teeth can be individual teeth formed by a stack of ferromagnetic laminae and insulating non-magnetic laminae with a high proportion of glass fibre, each ferromagnetic lamina being enveloped in the lamnateed insulant, so that the teeth have very good mechanical strength and the mean iron induction in a strong field is reduced by the non-magnetic laminae.

The teeth can also be formed by some parts of a ring formed by a multi-turn winding of two tapes or strips which are disposed one beside another and one of which is made of magnetic metal and the other of a fibrous non-magnetic insulant, such winding being deformed subsequently to give parts which are alternately nearer and further from the center of the ring. The parts which are relatively far from the center rotate between the stator poles and form the rotor teeth, whereas the parts which are relatively near the center rotate outside the stator field and have no effect.

According to another feature of the invention, each stator pole is formed by the connection between two arms of two groups of U-shaped laminations, preferably of grain-oriented magnetic metal, and when the machine operates the semi-circular parts of the lamination groups mix the alternating modulated fluxes to provide a constant flux.

The invention will be better understood from the following description and accompanying drawings in which:

FIG. 1 is a view in axial half-section of a three-phase synchronous motor according to the invention;

FIG. 2 is a half-section of the machine shown in FIG. 1, looking from the right and along the section line II—II, so as to show the rotor teeth and the stator tip ends;

FIG. 3 is a section on the line III—III of FIG. 2, showing the arrangement of the stator poles;

Figure 5:
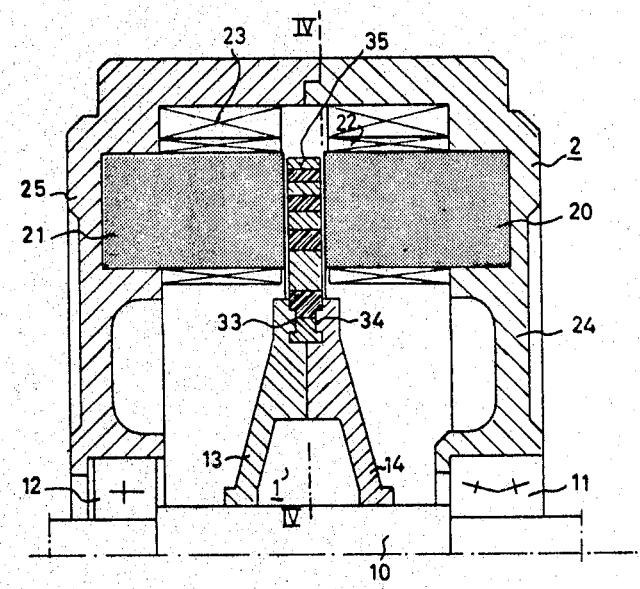

The motor shown by way of example in the accompanying drawings is constructed in accordance with the principles hereinbefore referred to of saturated-teeth variable-reluctance electrical machinery. This motor is a three-phase synchronous motor for operation on 50 or 60 cycles per second industrial current, and rotor inertia must be so related to the forces applied to the teeth that the rotor reaches its synchronous speed in less than 0.01 second, so as to be startable without external mechanical drive.

The rotor 1 is formed by:

A non-magnetic shaft 10 mounted in anti-friction bearings 11, 12;

Two metal support members 13, 14 rigidly secured to the shaft 10, and

Eight teeth 15 which are retained by the support members 13, 14. Each tooth takes the form of a stack of 0.2 mm. thick pure iron laminae 16 whose main surfaces extend parallel to the machine axis. Each lamina 16 is separated from the adjacent lamina by a 0.144 mm. thick insulating layer 17, the insulant being a glass-fibre-loaded material which sticks strongly to the surface of the iron laminae. Each lamina has a base 30 which is wider than the tooth and which has two symmetrical shoulders 18 providing very good anchorage in circular grooves 19 in the inside surfaces of the support members 13, 14.

The stator 2 is formed by:

Trapezoidal cross-section magnetic tips 20, 21 arranged in the form of two rings each comprising twenty-four poles;

Forty-eight main windings 22 disposed on each pole three consecutive main windings being energised by the three phases of a three-phase supply;

Two exciting windings 23 in the form of circular rings encircling the main winding assembly, and Two direct-current extra-mild steel substantially symmetrical support members 24, 25 which bear the poles 20, 21 and close the magnetic circuit around the back of the exciting windings 23.

The poles 10, 21 are made of grain-oriented silicon steel laminations, the orientation of the grain in the poles extending parallel to the machine axis. The laminations are stacked to form a U-circuit by a continuous strip or tape being wound into an oblong winding and cut into two symmetrical sections. Each pole 20, 21 consists of two adjacent "back-to-back" arms of two U-circuits 26, 27 or 28, 29.

The two rings of poles are disposed symmetrically of the rotor plane and bound twenty-four airgaps in which the eight teeth move. When the motor is running, the ampere turns of the exciting windings (or, where applicable, the action of a permanent magnet) produce in the airgaps a magnetic field which extends parallel to the machine shaft and which the main winding ampere-turns increase or reduce. The saturated teeth are urged by these magnetic field difference and, via the rotor support members 13, 14, apply a torque to the shaft to rotate the same.

Figure 4:
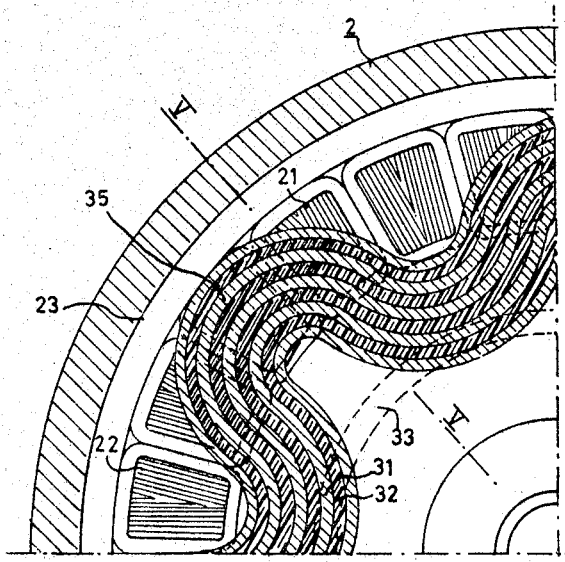
FIG. 4 is a view in axial half-section of a three-phase synchronous motor according to the invention wherein the rotor teeth are embodied by an appropriately deformed ring of metallic and insulating laminae; and, FIG. 5 is a partial section along the line V—V of FIG. 4.

Referring now to FIGS. 4 and 5, the motor stator is the same as in FIG. 1, but the rotor teeth 35, although as in FIG. 1 formed by preferably pure iron ferromagnetic laminations separated from one another by non-magnetic insulating laminations formed by glass fibre enveloped in a thermosetting material, are constructed differently from FIG. 1. The rotor tooth system is devised from a single ferromagnetic strip or tape or the like 31 which is first wound around a cylinder together with a strip or tape or the like of glass fabric 32 to form a ring having an outer diameter from 5 to 20 percent greater than the outer diameter of the finished rotor.

The resulting ring is then deformed, but not as far as the elastic limit of the metal plate 31, to form the rotor teeth. To this end, the ring parts between two consecutive teeth are pushed towards the center of the ring so as always to be outside the stator airgaps when the machine is assembled.

When shaping has been completed by means of appropriate equipment, a thermosetting material is injected into the glass fabric, whereafter the ring assembly, maintained in its final shape, is moulded at elevated temperature to form a non-deformable element. Such element is then formed with two circular grooves 33, 34 to receive the rotor support members 13, 14 which are rigidly secured to the machine shaft 10.

The main advantage of this feature is the cheapness of manufacturing the rotor, since manufacture and the positioning of the teeth cease to be separate operations.

The force acting per unit of tooth front area is expressed by the product of the mean magnetization intensity (or intrinsic induction) of the tooth in a strong field by the field difference between the airgap which the tooth is entering and the airgap which the tooth is leaving. In one machine according to this invention, the mean magnetization intensity is 1.25 tesla (weber per m.$^2$), the effective mean field difference reaches 400,000 amperes per meter and so the force per area unit of the tooth front is $1.25 \times 400,000 = 500,000$ newtons per m.$^2$. This force is applied to a tooth mass having a value equal to the mean density of the tooth multiplied by its mean length along a circumference around the machine axis. In the event, the mean density of the tooth is 5,550 kg/m.$^3$ and the length is 0.03 meter, and so the tooth mass to which the force is applied is $5,550 \times 0.03 = 167$ kg; if 50 percent is added to the figure for tooth inertia to cover the mass of the rotor support members and shaft, the figure for tooth mass becomes $167 + 83 = 250$ kg. The acceleration applied to the rotor tooth is therefore approximately $500,000/250 = 2,000$ m.sec.$^{-2}$.

Since the mean peripheral velocity of the teeth when operating on 50 cycles per second is about 3 meters/second, the rotor will run up to this speed in $3/2,000 = 0.0015$ second, and so the synchronous motor will start independently without any special facility (provided only that the immediate inertia of the driven masses outside the machine is not excessive).

The features described therefore lead to the construction of electrical machines—motor or alternators—wherein the ratio of the useful torque to the inertia of the rotor is much lower than in conventional machines, with the result of technical and economic advantages, since the performances of many mechanical devices can be improved by the large variations in angular velocity which the invention can provide.

What we claim is:

1. A variable-reluctance electrical machine capable of rotating about a shaft and comprising a stator including magnetic poles arranged in two parallel rings separated by a gap parallel to the axis of said shaft, the magnetic poles to the two rings being respectively opposite one another, means for producing in said gap a direct-current magnetic field parallel to said axis, means for producing in said gap alternating current magnetic fields parallel to said axis between opposite magnetic poles, and a rotor secured to said shaft and including teeth formed by a stack of alternately radially arranged magnetic material laminae and non-magnetic material laminae, said stack consisting of at least one strip of magnetic material and one strip of non-magnetic material wound together into a circular ring which is subsequently deformed to present angularly alternating maximum radius parts forming said teeth and minimum radius parts, said rotor further comprising two support members of non-magnetic material securing said deformed circular ring to said shaft.

2. A variable-reluctance machine as claimed in claim 1, in which said non-magnetic material in said teeth consists of glass fiber enveloped in a thermosetting material.

3. A variable-reluctance machine as claimed in claim 1, in which said means for producing said direct-current field consist of exciter windings.

4. A variable-reluctance machine as claimed in claim 1, in which said means for producing said direct-current field include a permanent magnet.

References Cited

UNITED STATES PATENTS

| | | | |
|---|---|---|---|
| 3,225,235 | 11/1965 | Lee | 310—268 |
| 3,239,702 | 3/1966 | Van de Graaff | 310—268 |
| 3,383,533 | 5/1968 | Jarret | 310—168 |

WARREN E. RAY, Primary Examiner

R. SKUDY, Assistant Examiner

U.S. Cl. X.R.

310—154, 268